(12) United States Patent
Wai et al.

(10) Patent No.: US 10,570,027 B2
(45) Date of Patent: Feb. 25, 2020

(54) CONVERTING ACRYLIC FIBERS TO AMIDOXIME-CARBOXYLATE CONTAINING POLYMER ADSORBENTS FOR SEQUESTERING URANIUM AND OTHER ELEMENTS FROM WATER

(71) Applicants: Chien M. Wai, Seattle, WA (US); Horng-Bin Pan, Seattle, WA (US); Gary A. Gill, Richland, WA (US); Li-Jung Kuo, Richland, WA (US)

(72) Inventors: Chien M. Wai, Seattle, WA (US); Horng-Bin Pan, Seattle, WA (US); Gary A. Gill, Richland, WA (US); Li-Jung Kuo, Richland, WA (US)

(73) Assignees: Battelle Memorial Institute, Richland, WA (US); University of Idaho, Moscow, ID (US)

( * ) Notice: Subject to any disclaimer, the term of this patent is extended or adjusted under 35 U.S.C. 154(b) by 410 days.

(21) Appl. No.: 15/179,766

(22) Filed: Jun. 10, 2016

(65) Prior Publication Data
US 2017/0355621 A1 Dec. 14, 2017

(51) Int. Cl.
| C02F 1/28 | (2006.01) |
| C08F 8/12 | (2006.01) |
| C08F 8/30 | (2006.01) |
| B01J 20/26 | (2006.01) |
| B01J 20/28 | (2006.01) |
| C02F 103/20 | (2006.01) |
| C02F 101/00 | (2006.01) |
| C02F 101/10 | (2006.01) |
| C02F 103/08 | (2006.01) |

(52) U.S. Cl.
CPC .......... $C02F\ 1/285$ (2013.01); $B01J\ 20/264$ (2013.01); $B01J\ 20/28023$ (2013.01); $B01J\ 20/28033$ (2013.01); $C08F\ 8/30$ (2013.01); $C02F\ 2101/10$ (2013.01); $C02F\ 2103/08$ (2013.01)

(58) Field of Classification Search
None
See application file for complete search history.

(56) References Cited

U.S. PATENT DOCUMENTS

| 3,063,951 A | 11/1962 | Schouteden | |
| 5,064,879 A * | 11/1991 | Shiga | B01J 20/26 521/38 |
| 10,391,472 B2 | 8/2019 | Dai et al. | |
| 2010/0213134 A1* | 8/2010 | Campbell | C02F 1/42 210/682 |

(Continued)

FOREIGN PATENT DOCUMENTS

| FR | 2252438 | 6/1975 | |
| WO | WO-2014031702 A1 * | 2/2014 | ............... G21F 9/12 |

OTHER PUBLICATIONS

Kawai et al. (Radiation Physics and Chemistry, 2000, 59, 405-411. (Year: 2000).*

(Continued)

Primary Examiner — Clare M Perrin
(74) Attorney, Agent, or Firm — Klarquist Sparkman, LLP

(57) ABSTRACT

A fiber comprising a carbon chain backbone and amidoxime, carboxylate, and nitrile pendant groups. The fiber may be used for removing uranium from seawater and toxic metals from drinking water.

15 Claims, 2 Drawing Sheets

(56) References Cited

U.S. PATENT DOCUMENTS

2013/0071659 A1     3/2013   Janke et al.
2017/0326530 A1*   11/2017   Dai .................... B01J 20/28023

OTHER PUBLICATIONS

Bayramoglu et al., "MCM-41 silica particles grafted with polyacrylonitrile,: Modification in to amidoxime and carboxyl groups for enhanced uranium removal from aqueous medium," *Microporous and Mesoporous Materials*, vol. 226, pp. 117-124, Dec. 30, 2015.
International Search Report and Written Opinion issued for International Application No. PCT/US201726663 dated Dec. 20, 2017.
Choi et al., "Adsorption of $UO^{2+2}$ by polyethylene adsorbents with amidoxime, carboxyl, and amidoxime/carboxyl group," *Radiation Physics and Chemistry*, vol. 57, pp. 187-193, 2000.
Das et al., "Extracting Uranium from Seawater: Promising AF Series Adsorbents," *Ind. Eng. Chem. Res.*, vol. 55, pp. 4110-4117, Nov. 2, 2015.
Das et al., "Extracting Uranium from Seawater: Promising AI Series Adsorbents," *Ind. Eng. Chem. Res.*, vol. 55, pp. 4103-4109, Nov. 10, 2015.
Das et al., "Novel poly(imide dioxime) sorbents: Development and testing for enhanced extraction of uranium from natural seawater," *Chemical Engineering Journal*, vol. 298, pp. 125-135, Apr. 9, 2016.
Gill et al., "The Uranium from Seawater Program at the Pacific Northwest National Laboratory: Overview of Marine Testing, Adsorbent Characterization, Adsorbent Durability, Adsorbent Toxicity, and Deployment Studies," *Ind. Eng. Chem. Res.*, 55(15): 4264-4277, Feb. 7, 2016.
Kato et al., "Preparation of Amidoxime Fibers for Recovery of Uranium from Seawater," *Journal of Chemical Engineering of Japan*, 23(6): 744-750, 1990.
Kawai et al., "Comparison of Amidoxime Adsorbents Prepared by Cografting Methacrylic Acid and 2-Hydroxyethyl Methacrylate and Acrylonitrile onto Polyethylene," *Ind. Eng. Chem. Res.*, vol. 39, pp. 2910-2915, 2000.
Kawai et al., "Preparation of hydrophilic amidoxime fibers by cografting acrylonitrile and methacrylic acid from an optimized monomer composition," *Radiation Physics and Chemistry*, vol. 59, pp. 405-411, 2000.
Kobuke et al., "Composite Fiber Adsorbent for Rapid Uptake of Uranyl from Seawater," *Ind. Eng. Chem. Res.*, vol. 27, pp. 1461-1466, 1988.
Kuo et al., "Characterization and Testing of Amidoxime-Based Adsorbent Materials to Extract Uranium from Natural Seawater," *Ind. Eng. Chem. Res.*, 55(15): 4285-4293, Nov. 19, 2015.
Lindner et al., "Review of cost estimates for uranium recovery from seawater," *Energy Economics*, vol. 49, pp. 9-22, Feb. 14, 2015.
Pan et al., "Towards Understanding KOH Conditioning of Amidoxime-based Polymer Adsorbents for Sequestering Uranium from Seawater," *RSC Advances*, No. 122, pp. 100715-100721, Nov. 17, 2015.
Saito et al., "Characteristics of Uranium Adsorption by Amidoxime Membrane Synthesized by Radiation-Induced Graft Polymerization," *Journal of Membrane Science*, vol. 34, pp. 307-315, 1987.
Saito et al., "Porous Amidoxime-Group-Containing Membrane for the Recovery of Uranium from Seawater," *Ind. Eng. Chem. Res.*, vol. 26, pp. 1977-1981, 1987.
Sekiguchi et al, "Effect of Seawater Temperature on Uranium Recovery from Seawater Using Amidoxime Adsorbents," *Ind. Eng. Chem. Res.*, 33(3): 662-666, 1994.
Katragadda et al., "The extraction of uranium by amidoximated orlon," *Talanta*, 45(2): 257-263, Dec. 19, 1997.
Zhao et al., "A study on the degree of amidoximation of polyacrylonitrile fibers and its effect on their capacity to adsorb uranyl ions," *Ind. Eng. Chem. Res.*, vol. 54, pp. 3101-3106, Mar. 11, 2015.

\* cited by examiner

CONVERTING ACRYLIC FIBERS TO AMIDOXIME-CARBOXYLATE CONTAINING POLYMER ADSORBENTS FOR SEQUESTERING URANIUM AND OTHER ELEMENTS FROM WATER

ACKNOWLEDGMENT OF GOVERNMENT SUPPORT

This invention was made with Government support under Contract No. DE-AC05-76RL01830 awarded by the U.S. Department of Energy. The Government has certain rights in the invention.

BACKGROUND

Extraction of uranium from seawater is an area of interest as a means to provide a stable and economic supply of fuel for nuclear reactors. Amidoxime-based polymer adsorbents have been extensively studied for the last several decades as the most promising approach for sequestering uranium from seawater because of their high uranium adsorption capacities.

SUMMARY

Disclosed herein is a fiber comprising a carbon chain backbone and amidoxime, carboxylate, and nitrile pendant groups.

Also disclosed herein is a polymer having a repeating unit of:

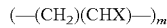

wherein each X is the same or different and is a pendant group selected from amidoxime, carboxylate, and nitrile groups, provided that the polymer includes at least one amidoxime pendant group, at least one carboxylate pendant group, and at least one nitrile pendant group; and m is 100 to 10000.

Further disclosed herein is a polymer having a structure comprising:

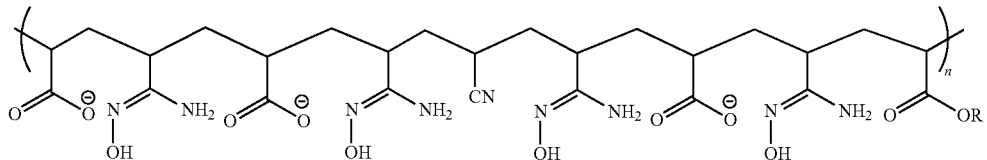

wherein R is an alkyl, a substituted alkyl, a cycloalkyl, a heterocycloalkyl, an aryl, or a heteroaryl group; and n is 100 to 10000.

Additionally disclosed herein is a method for making a functionalized fiber comprising:

subjecting an acrylic, polyacrylonitrile, and/or polyacrylonitrile copolymer fiber to amidoximation under conditions sufficient for converting a portion of the nitrile pendant groups of the acrylic, polyacrylonitrile, and/or polyacrylonitrile copolymer fiber into amidoxime pendant groups resulting in an intermediate product; and subjecting the intermediate product to carboxylation under conditions sufficient for converting a portion of the remaining nitrile pendant groups into carboxylate pendant groups and a portion of the ester pendant groups into carboxylate pendant groups, providing that nitrile pendant groups and ester pendant groups remain after the carboxylation.

The foregoing will become more apparent from the following detailed description, which proceeds with reference to the accompanying figures.

DETAILED DESCRIPTION

Figure 1A:
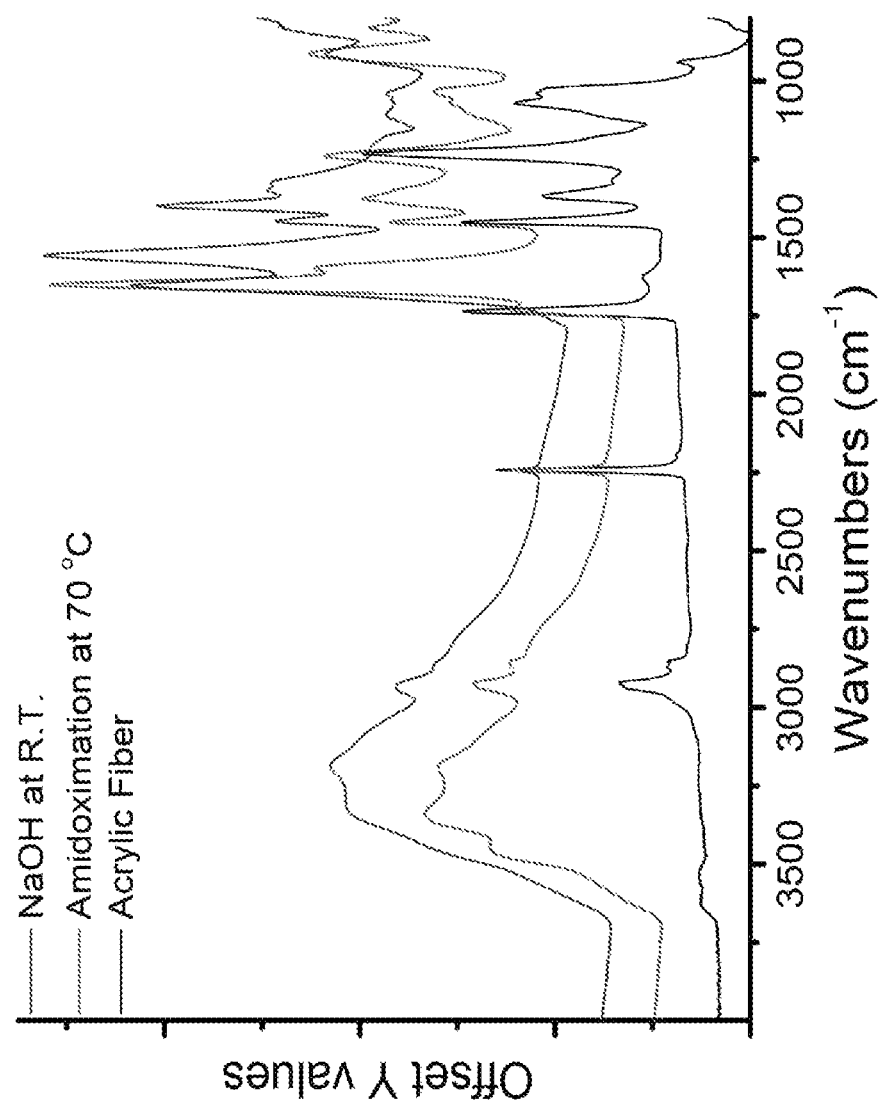
FIGS. 1A and 1B. FTIR spectra of acrylic fiber, original (black), after $NH_2OH$ treatment (red), and after NaOH treatment (blue). Peak intensity of each functional group is proportional to its concentration in the fiber.

There are several ways in which uranium mining from seawater can be made economically feasible. The most straightforward approach is to reduce the cost of producing the adsorbent. Another approach is to increase the capacity of the adsorbent, such that more uranium can be extracted per unit mass of adsorbent. Hence, any increase in adsorbent capacity (i.e. g of uranium/kg of adsorbent) will directly be reflected in the cost to mine uranium from seawater. Finally, making an adsorbent more durable so that it can be used through multiple adsorption/elution cycles (or reuse of the adsorbent) will also lower the cost of mining uranium from seawater.

Disclosed herein is a new methodology for producing amidoxime-functionalized polymer adsorbents for the extraction of uranium and other elements from seawater. The methodology uses inexpensive and commercially available materials that will significantly reduce the cost associated with extraction of uranium from seawater, while at the same time produces an adsorbent that has equal or better adsorption capacity for uranium than the best known adsorbents described in the literature. This advancement will have a significant impact on the advancement of the technology to extract uranium from seawater and more importantly, make it cost competitive with mining uranium from terrestrial sources. The methodology differs from previous approaches and may have advantages in several areas including: (1) it does not require a radiation-induced grafting step that significantly reduces cost and effort of adsorbent production; (2) it produces a product that has much higher mechanical strength enabling a more robust product, especially for adsorbent reuse; (3) the adsorbents produced by radiation induced grafting require a treatment with potassium hydroxide to initiate their adsorption capability, the adsorbent disclosed herein does not; (4) this synthesis using acrylic fiber as the starting backbone, differs from the commonly used polyethylene used in radiation induced grafting synthesis approaches, and the starting fiber contains ester groups which help to make the final product more durable; and (5) the final product produced by this method contains carboxylate groups. These carboxylate/carboxylic acid groups add functionality and durability to the adsorbent material not available with the other synthesis methods. The mild conversion conditions (low temperature and short reaction times) produce a final product that is composed primarily of branched or open chain amidoxime functional groups rather than cyclic amidoxime functional groups. In certain embodiments, the final product includes no, or is substantially free of, cyclic amidoxime functional groups (i.e., all of the amidoxime functional groups are branched or open chain). This feature results in reducing the binding of vanadium in favor of uranium. The saturation reaction rate of this adsorbent is considerably faster than amidoxime-based adsorbents prepared by radiation induced grafting approaches. For example, the radiation induced grafted amidoxime-based polymeric adsorbents have half saturation times of approximately 3 weeks, while the amidoxime-based adsorbents described herein have half saturation times of approximately 2 weeks.

In certain embodiments, the functionalized polymer product has a carbon chain backbone that includes amidoxime, carboxylate, nitrile, and ester pendant groups. In certain examples, the functionalized polymer product may have a repeating unit of:

(—(CH$_2$)(CHX)—)$_m$ wherein each X is the same or different and is a pendant group selected from amidoxime, carboxylate, nitrile, and ester groups provided that the polymer includes at least one amidoxime pendant group, at least one carboxylate pendant group, and at least one nitrile pendant group; and m is 100 to 10000, more particularly 1000 to 5000.

In certain embodiments, the amidoxime pendant group has a structure of:

—C(NH$_2$)(=NOH)

In certain embodiments, the carboxylate pendant group has a structure of:

—C(=O)(O)$^-$

Illustrative groups for the carboxylate cation include Na$^+$, K$^+$, Cs$^+$, Ca$^{++}$, Mg$^{++}$, NH$_4^+$, and similar cations.

In certain embodiments, the nitrile pendant group has a structure of:

—CN

In certain embodiments, the ester pendant group has a structure of:

—C(=O)(OR)

wherein R is an alkyl, particularly C$_1$-C$_6$ alkyl such as, for example, methyl, ethyl, propyl, isopropyl, butyl, iso-butyl, sec-butyl, pentyl, 3-pentyl, or hexyl; a substituted alkyl, a cycloalkyl, a heterocycloalkyl, an aryl, or a heteroaryl group; and/or the ester pendant group has a structure of:

—O—C(=O)R wherein R is an alkyl, particularly C$_1$-C$_6$ alkyl such as, for example, methyl, ethyl, propyl, isopropyl, butyl, iso-butyl, sec-butyl, pentyl, 3-pentyl, or hexyl; a substituted alkyl, a cycloalkyl, a heterocycloalkyl, an aryl, or a heteroaryl group.

It has been discovered that the ratios of amidoxime to carboxylate group and the unreacted nitrile pendant groups on the backbone fiber are important to controlling adsorption capacity and adsorption durability. In certain embodiments, the amidoxime/carboxylate mol ratio may range from 1:3 to 3:1, more particularly the ratio is 1:2 to 2:1. In certain embodiments, the amidoxime pendant groups are present in an amount of 20 to 80 mol %, more particularly 40 to 60 mol %, the carboxylate pendant groups are present in an amount of 80 to 20 mol %, more particularly 60 to 40 mol %, the unreacted nitrile pendant groups are present in an amount of greater than 0 to 30 mol %, more particularly 5 to 15 mol %, and the unreacted ester pendant groups are present in an amount of 0 to 15 mol %, based on the total mols of the polymer. The functionalized polymer product contains unreacted nitrile groups on the backbone chain.

In one embodiment, the functionalized polymer product has a structure comprising:

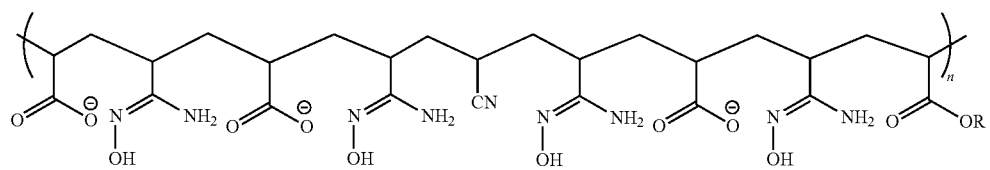

wherein R is an alkyl, particularly C$_1$-C$_6$ alkyl, such as, for example, methyl, ethyl, propyl, isopropyl, butyl, iso-butyl, sec-butyl, pentyl, 3-pentyl, or hexyl; a substituted alkyl, a cycloalkyl, a heterocycloalkyl, an aryl, or a heteroaryl group; and n is 100 to 10000, more particularly 1000 to 5000.

Illustrative groups for the carboxylate cation include Na$^+$, K$^+$, Cs$^+$, Ca$^{++}$, Mg$^{++}$, NH$_4^+$, and similar cations. In certain embodiments, the cation on the carboxylate is Na+, which comes from the NaOH used to convert CN to carboxylate. An alternate is K+ if KOH is used for the conversion. Once placed in seawater, there will be a displacement of the K (or Na) and the carboxylate will be bound predominately with Ca++ and Mg++, the dominant doubly charged cations in seawater. Smaller amounts of K+ and Na+ will also be present as these are the dominant singly charged cations in seawater.

In one embodiment, the functionalized polymer product may be synthesized according to the following scheme:

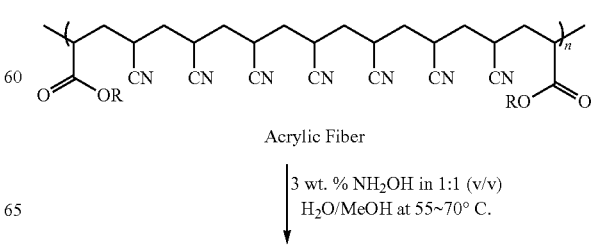

Acrylic Fiber 3 wt. % NH$_2$OH in 1:1 (v/v) H$_2$O/MeOH at 55~70° C.

-continued

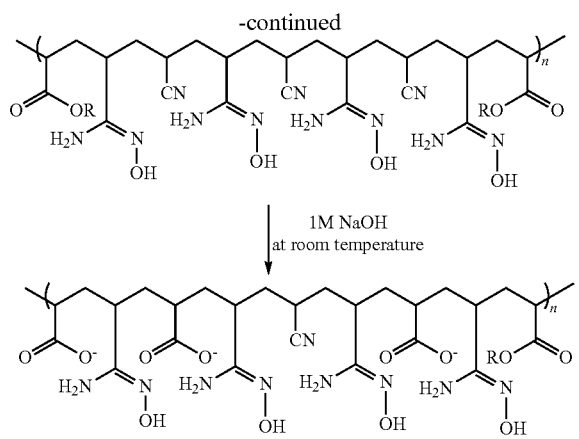

wherein R is an alkyl, particularly $C_1$-$C_6$ alkyl, such as, for example, methyl, ethyl, propyl, isopropyl, butyl, iso-butyl, sec-butyl, pentyl, 3-pentyl, or hexyl; a substituted alkyl, a cycloalkyl, a heterocycloalkyl, an aryl, or a heteroaryl group; and n is 100 to 10000, more particularly 1000 to 5000.

One step (amidoximation) involves converting a portion (less than 100%) of the nitrile pendant groups into amidoxime pendant groups. The amidoximation reaction time may range from 0.25 to 72 hours, the temperature may range from 30 to 80° C., and the amount of hydroxylamine hydrochloride ranges from 3-6%. The active reagent as the reaction occurs is hydroxylamine ($NH_2OH$). The production of hydroxylamine can be achieved from hydroxylammonium hydrochloride (Hyd-HCl) in two ways. (1) the Hyd-HCl is neutralized with KOH or NaOH first to prepare hydroxylamine ($NH_2OH$), or (2) the Hyd-HCl is diluted with a methanol/water solution to produce hydroxylamine. For example, an acrylic fiber (e.g. commercially available Orlon® yarn) is treated with a 3 weight % $NH_2OH$ solution made of 1:1 (volume ratio) methanol-$H_2O$ at temperature between 55-70° C. for 0.5 hour to 7 hours.

Another step (carboxylation) involves converting a portion (less than 100%) of the remaining nitrile groups into carboxylate groups and a portion of the ester groups into carboxylate groups. The carboxylation reaction time may range from 8 to 24 hours, the temperature is room temperature, and the amount of sodium hydroxide may range from 0.5 to 2.0 M. Alternatives to sodium hydroxide include KOH, CsOH, ammonium hydroxide, and other alkali solutions. For example, after the first step, the intermediate fiber is treated with 1 M NaOH at room temperature for 24 hours.

In certain embodiments, the amidoximation and carboxylation may be performed in reverse order from what is shown above.

The starting material may be an acrylic, polyacrylonitrile (PAN), and/or polyacrylonitrile copolymer fiber. For example, the polyacrylonitrile fiber may contain 15% ester copolymer. The fiber may be in the form of a monofilament or a multifilament yarn. In certain embodiments, the acrylic fiber or a multifilament yarn such as Orlon or Acrylan may have a diameter of 5 to 200 μm. One example of an acrylic fiber is commercially available Orlon® yarn.

The surface functionality (i.e. pendant groups) during synthesis and in the final product may be monitored via FTIR or by determining the conversion ratio of the nitrile groups. The conversion determination is a simple weight measurement before and after the synthesis:

% Conversion=$(W_1-W_0)/W_0 \times 100$

Figure 1B:
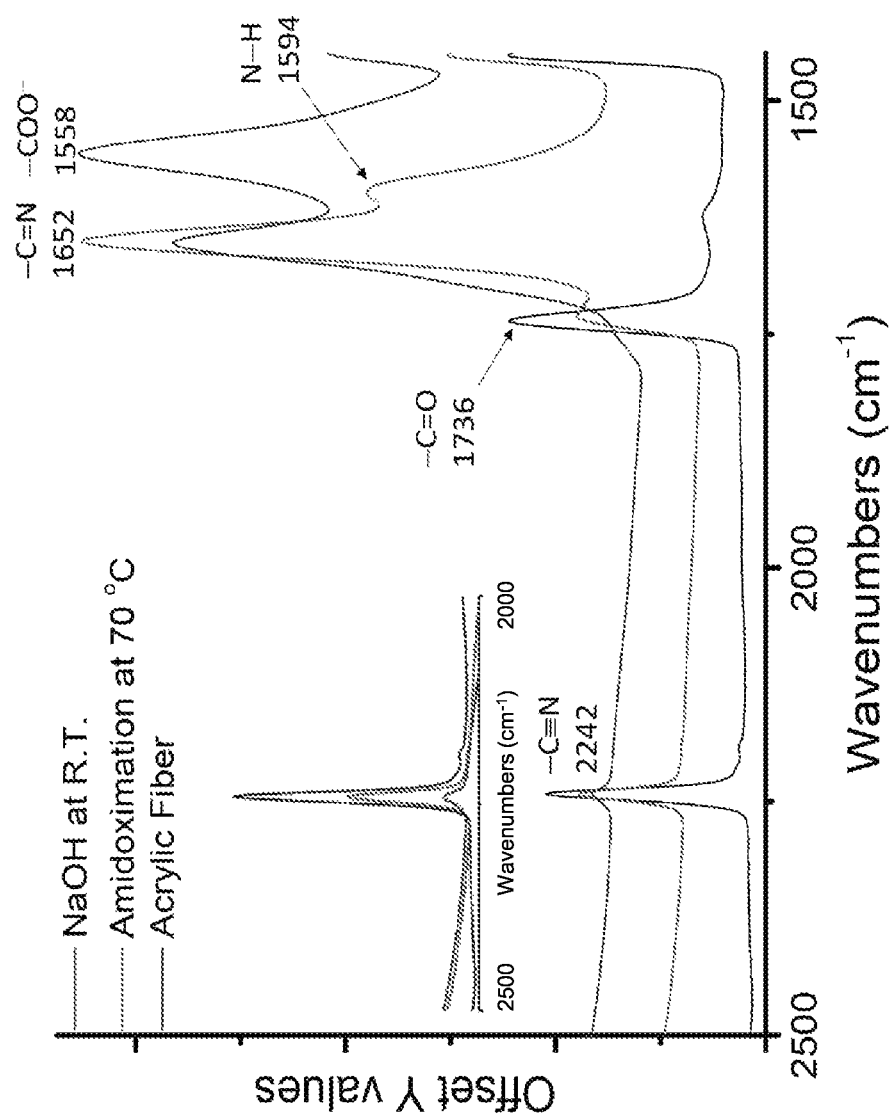

The FTIR methodology involves the use of infrared spectroscopy to control the relative composition of the pendant functional groups as shown in FIG. 1. For example, the decrease in the nitrile peak intensity at 2242 $cm^{-1}$ and the increase in —C=N peak intensity at 1652 $cm^{-1}$ in the first step of $NH_2OH$ treatment (amidoximation step) is a measure of the amount of the nitrile groups converted to amidoxime groups. In the second step of NaOH treatment, the increase in —COO peak intensity at 1558 $cm^{-1}$ and further decrease in the nitrile peak intensity at 2242 $cm^{-1}$ is a measure of the amount of the nitrile groups converted to carboxylate groups. The remaining nitrile peak intensity at 2242 $cm^{-1}$ is a measure of the amount of final nitrile groups in the polymer adsorbent. In one example, the adsorbent with the highest uranium adsorption capacity typically has the ratio of amidoxime:carboxylate:nitrile=45%:45%:10%.

The functionalized product may be in the form of a fiber. The fiber may be provided in the form of a monofilament, a multifilament yarn, a fabric, or similar textiles. In certain embodiments, the functionalized fiber or a multifilament yarn may have a diameter of 5 to 200 μm.

In one aspect, the final amidoxime- and carboxylate-containing polymer fibers showed very high uranium adsorption capacities (e.g., greater than 3.0 mg U per g of adsorbent after 21 days of exposure to seawater) tested in a flowing seawater column system. The test systems are described in Kuo et al, Characterization and Testing of Amidoxime-Based Adsorbent Materials to Extract Uranium from Natural Seawater. *Ind Eng Chem Res* 2016, 55, 4285-4293; Gill et al., The Uranium from Seawater Program at the Pacific Northwest National Laboratory: Overview of Marine Testing, Adsorbent Characterization, Adsorbent Durability, Adsorbent Toxicity, and Deployment Studies. *Ind Eng Chem Res* 2016, 55, 4264-4277; and Pan et al, Towards Understanding KOH Conditioning of Amidoxime-based Polymer Adsorbents for Sequestering Uranium from Seawater. *RSC Advances* 2015, 5, 100715-100721.

Prior amidoxime-based polymeric adsorbents are not exclusively selective for uranium. They adsorb many of the trace elements in seawater, most notably vanadium. An adsorbent that reduces the adsorption of vanadium will result in an increase in the capacity of uranium. The adsorption of U and V from seawater is related to the specific form of the amidoxime-binding ligand that is created on the adsorbent. Cyclic imidedioxime has a higher affinity for vanadium compared to uranium, while the single—meaning non-cyclic (open chain) amidoxime ligand has a weak affinity for vanadium. Hence, an amidoxime-based adsorbent that reduces the abundance of the cyclic form of the amidoxime, will favor the sequestering of uranium over vanadium. An example of a non-cyclic diamidoxime ligand (in the structures above the amidoxime pendant group is shown as a single open-chain group) (left) and an example of a cyclic imidedioxime ligand (right) are shown below:

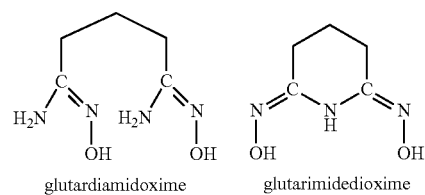

glutardiamidoxime      glutarimidedioxime

Disclosed herein in certain aspects is an adsorbent that favors U over V by controlling the adsorbent synthesis. In certain embodiments, the adsorbent disclosed herein has a V/U adsorption weight ratio of 2:1 to 1:2, more particularly 1.2:1 to 1:1.2.

In certain embodiments, the adsorbent disclosed herein may also adsorb Ca, Mg, V, U, Na, Fe, Zn, Cu, Ni, Sr, Ti, Co, Cr and/or Mn. The adsorbent also retains smaller amounts of rare earth elements (e.g. Nd) and precious metals (Ag, Au, Pt, and Pd).

The adsorbent disclosed herein may also be used in freshwater and drinking water. In general, the adsorbent may be capable of extracting uranium and other elements from any aqueous solution at a pH of 6-10.

The synthesis method disclosed herein uses at least two approaches to reduce the cost of the production of the adsorbent: (1) use a cheaper starting material for the adsorbent backbone, and (2) use a chemical process that eliminates the need for a radiation-induced grafting process step in the synthesis. Using acrylic fibers as starting material and with simple chemical treatments described herein, a highly efficient uranium adsorbent can be produced with low production cost. This novel adsorbent synthesis approach could make extraction of uranium from seawater economically feasible.

Prior high capacity uranium adsorbents production involves a step where the surface of the adsorbent fiber is irradiated to create reactive sites using either an intense electron stream or gamma radiation from a radiation source. This is referred to as radiation-induced graft polymerization (RIGP). The process disclosed herein eliminates this step, which will significantly reduce the cost of producing the adsorbent.

In addition, most of the prior amidoxime-based polymeric adsorbents require a "conditioning step" with potassium hydroxide prior to deployment in seawater. The presently disclosed adsorbents do not require such a conditioning step.

As noted above, the ratios of amidoxime to carboxylate group and the unreacted nitrile on the backbone fiber are important to controlling adsorption capacity and adsorption durability. Complete conversion of nitrile groups of PAN to amidoxime groups tends to weaken the mechanical strength of the fiber and makes the material less suitable for seawater adsorption applications. This is particularly critical to adsorbent re-use. Partial conversion of the nitrile groups to amidoxime groups, as disclosed herein, increases the mechanical strength of the fibers. Leaving some of the nitrile groups unreacted on the backbone fiber is also critical to adsorbent durability.

The most common method reported in recent literature for producing an amidoxime-based adsorbent material involves a step where the backbone polymer is first irradiated using an electron beam or radiation source (referred to as radiation-induced grafting) to make reactive sites on the polymer surface to which functional groups can be attached. The presently disclosed process eliminates the radiation-induced grafting step, thus achieving a significant reduction in adsorption synthesis costs.

Example

An acrylic fiber (e.g. commercially available Orlon® yarn) is treated with a 3 weight % $NH_2OH$ solution made of 1:1 (volume ratio) methanol-$H_2O$ at temperature between 55-70° C. for 0.5 hour to 7 hours. After the first step, the intermediate fiber is treated with 1 M NaOH at room temperature for 24 hours.

The adsorption capacity of uranium is approximately 4 g U/kg of adsorbent after 21 days of exposure in natural seawater at 20° C. and reaches a capacity of 6 g U/kg adsorbent after 56 days of exposure in natural seawater at 20° C. The adsorbent can be reused following stripping with $KHCO_3$ or weak acid (HCl).

In view of the many possible embodiments to which the principles of the disclosed invention may be applied, it should be recognized that the illustrated embodiments are only preferred examples of the invention and should not be taken as limiting the scope of the invention.

What is claimed is:

1. A method of removing uranium from seawater comprising contacting seawater with a fiber comprising a polymer having a structure comprising:

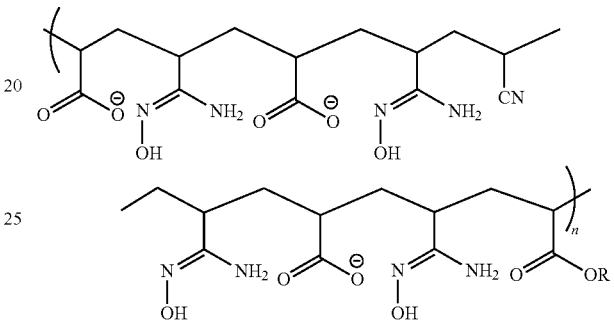

wherein R is an alkyl, a substituted alkyl, a cycloalkyl, a heterocycloalkyl, an aryl, or a heteroaryl group; and n is 100 to 10,000.

2. The method of claim 1, wherein uranium is absorbed onto the fiber and the method further comprises removing the absorbed uranium from the fiber.

3. The method of claim 1, wherein the fiber preferentially adsorbs uranium relative to vanadium.

4. The method of claim 1, wherein the fiber has a V/U adsorption weight ratio of 2:1 to 1:2.

5. The method of claim 1, wherein the fiber further comprises at least one carboxylate cation selected from $Na^+$, $K^+$, $Cs^+$, $Ca^{++}$, $Mg^{++}$, and $NH_4^+$.

6. The method of claim 1, wherein the fiber is made by a method comprising:
subjecting an acrylic, polyacrylonitrile, and/or polyacrylonitrile copolymer fiber to amidoximation under conditions sufficient for converting a portion of the nitrile pendant groups of the acrylic, polyacrylonitrile, and/or polyacrylonitrile copolymer fiber into amidoxime pendant groups resulting in an intermediate product; and
subjecting the intermediate product to carboxylation under conditions sufficient for converting a portion of the remaining nitrile pendant groups into carboxylate pendant groups.

7. The method of claim 1, wherein R is methyl, ethyl, propyl, isopropyl, butyl, iso-butyl, sec-butyl, pentyl, 3-pentyl, or hexyl.

8. The method of claim 1, wherein n is 1000 to 5000.

9. The method of claim 1, wherein the fiber further comprises a $Na^+$ carboxylate cation.

10. The method of claim 9, wherein R is methyl, ethyl, propyl, isopropyl, butyl, iso-butyl, sec-butyl, pentyl, 3-pentyl, or hexyl.

11. The method of claim 9, wherein uranium is absorbed onto the fiber and the method further comprises removing the absorbed uranium from the fiber.

12. The method of claim 11, wherein the fiber is in a form of a monofilament, a multifilament yarn, or a fabric.

13. The method of claim 9, wherein the fiber is in a form of a monofilament, a multifilament yarn, or a fabric.

14. The method of claim 1, wherein the fiber is in a form of a monofilament, a multifilament yarn, or a fabric.

15. The method of claim 1, wherein the fiber has a diameter of 5 to 200 μm.

* * * * *